United States Patent [19]

Kaji et al.

[11] Patent Number: 4,750,122

[45] Date of Patent: Jun. 7, 1988

[54] METHOD FOR SEGMENTING A TEXT INTO WORDS

[75] Inventors: Hiroyuki Kaji, Tama; Yoshihiko Nitta, Sagamihara; Atsuko Isatsu, Machida; Fumon Shimizu, Kawasaki, all of Japan

[73] Assignee: Hitachi, Ltd., Tokyo, Japan

[21] Appl. No.: 760,918

[22] Filed: Jul. 31, 1985

[30] Foreign Application Priority Data

Jul. 31, 1984 [JP] Japan .................... 59-162443

[51] Int. Cl.⁴ ............... G06F 15/38; G06F 15/70
[52] U.S. Cl. ........................... 364/419; 364/900
[58] Field of Search ..................... 364/419, 900

[56] References Cited

U.S. PATENT DOCUMENTS 4,502,128  2/1985  Okajima et al. ............ 364/419 X
4,586,190  4/1986  Amano et al. ............. 364/419 X
4,641,264  2/1987  Nitta et al. .............. 364/419 X Primary Examiner—Joseph F. Ruggiero
Assistant Examiner—Charles B. Meyer
Attorney, Agent, or Firm—Antonelli, Terry & Wands

[57] ABSTRACT

A method of segmenting a text into words in which a dictionary search is made while using a character string in the text as a search key, and it is checked whether a word retrieved from the dictionary can be grammatically connected to another word adjacent thereto or not. Segmentation processing is carried out using only words registered in a word dictionary, processing for identifying an unknown word is carried out when the segmentation processing comes to a deadlock, and then the segmentation processing is continued for that portion of the text which follows the identified unknown word.

8 Claims, 6 Drawing Sheets

| | NOUN | WORD STEM OF "S" SERIES IRREGULAR CONJUGATION VERB | VERB | AUXILIARY VERB "SURU (do)" | CASE POSTPOSITION | UNKNOWN WORD |
|---|---|---|---|---|---|---|
| HEAD OF SENTENCE | I | I | I | O | O | I |
| NOUN | I | I | O | O | I | I |
| WORD STEM OF "S" SERIES IRREGULAR CONJUGATION VERB | I | I | O | I | I | I |
| PREFIX | I | I | O | O | O | I |
| UNKNOWN WORD | I | I | O | I | I | I |

METHOD FOR SEGMENTING A TEXT INTO WORDS

BACKGROUND OF THE INVENTION

1. Field of the Invention

The present invention relates to a method of segmenting a text into words and more particularly to a method of automatically segmenting a text into words, suitable for use in a Japanese language processing system for processing an input text which may contain unknown words.

2. Description of the Prior Art

In various kinds of natural language processing systems including machine translation, a dictionary is used which employs a word as an index, and the processing of a text is carried out while searching the dictionary (refer to, for example, a Japanese Patent application specification unexamined publication No. sho 56-17467). However, it is impossible to previously register all words which may appear in the text, in the dictionary, and hence it is an important problem from the practical point of view to show how an unknown word is treated. That is, it is required to efficiently identify an unknown word contained in the text. Although an unknown word can be readily identified in a language having a space between words such as the English language, it is very difficult to identify an unknown word in an agglutinative language, such as the Japanese language.

In order to automatically process a text written in the language having no space between words, such as the Japanese language, it is required to segment the text into words at the first stage. For this purpose, a method has been widely used in which the text is scanned from the head, a word dictionary is searched by using a character string in the text as an index, and it is checked, for example on the basis of the part of speech whether a word can be connected to a preceding word. In this method, the segmentation of the text into words reaches a deadlock (that is, the dictionary search results in a failure or a word capable of being connected with the preceding word cannot be found) for two reasons, one of which is the presence of an unknown word and the other is the result of erroneous segmentation. Accordingly, when the segmentation reaches a deadlock the judgment cannot be immediately made that an unknown word is contained and it is required to carry out backtracking processing to get other segmenting possibilities. That is, in the case where the segmentation reaches a deadlock because of the presence of an unknown word, it can be judged that an unknown word is contained in the text only at a time the backtracking processing has reached the head of the text. Accordingly, it takes a lot of time to judge that the unknown word is contained in the text. Furthermore, in a case where it is judged that the unknown word is contained in the text, it is not easy to restart segmentation processing from the position of the unknown word. In more detail, since the backtracking processing is carried out without taking into consideration the presence of the unknown word and information on the result of segmentation having failed halfway is not preserved, it will be impossible to identify the position of the unknown word when it is judged that an unknown word is contained in the text.

As mentioned above, in various kinds of natural language processing systems, it is impossible to register all words in a dictionary from the practical point of view, and hence it is necessary to allow the presence of an unknown word in the input text. For example, in a machine translation system, it is preferred that a text containing an unknown word is not considered to be untranslatable but a translation containing the unknown word written in the source language is provided.

SUMMARY OF THE INVENTION

It is an object of the present invention to provide a method of segmenting a text into words which can solve the above problems of the prior art, can efficiently identify an unknown word contained in the text, and can continue the segmentation processing for that part of the text which follows the unknown word.

In order to attain the above object, according to the present invention, there is provided a method of segmenting a text into words in such a mannner that a word dictionary is searched by using a character string in the text as a search key, and it is checked whether or not a detected word can be connected grammatically to the preceding word, in which the segmentation processing is carried out on the basis of only the words registered in the word dictionary, and when the segmentation processing reaches a deadlock, the processing for identifying an unknown word is carried out to continue the segmentation processing for that part of the text which follows the unknown word.

DESCRIPTION OF THE PREFERRED EMBODIMENTS

Figure 1:
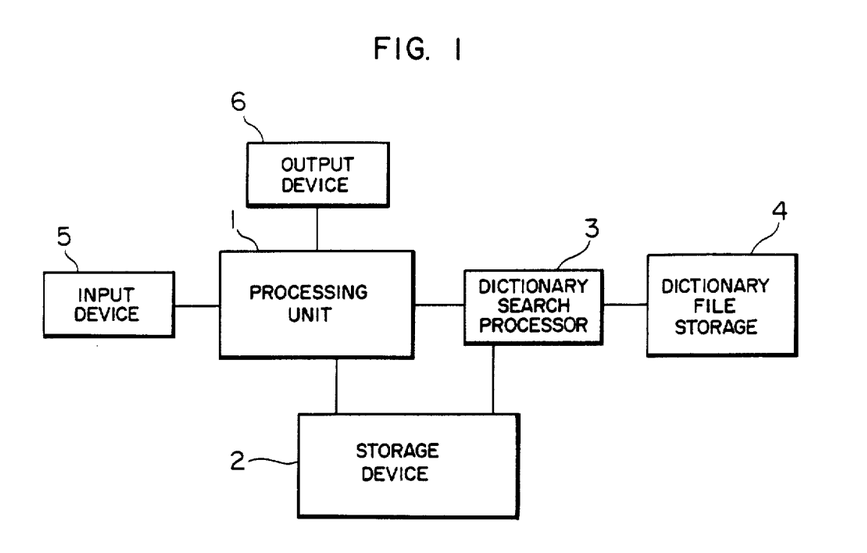
FIG. 1 is a block diagram showing a data processing system in which a segmentation method according to the present invention is used.

FIG. 1 shows, in block, a data processing system in which a segmentation method according to the present invention is used.

Referring to FIG. 1, the data processing system is made up of a processing unit 1, a storage device 2, a dictionary search processor 3, a dictionary file storage 4, an input device 5, and an output device 6.

The storage device 2 includes a text area for storing a text which is to be segmented into words, a reach key area KY for storing a character string which serves as a key for dictionary search, a dictionary record area for storing a record which has been retrieved from a dictionary, a connection matrix area for storing a connection matrix which is used for checking whether the connection between words is allowed or not grammatically, a segmentation stack area for storing the result of segmentation, auxiliary segmentation stack area for saving the result of segmentation thereto in backtracking processing, and other areas.

Figure 2:
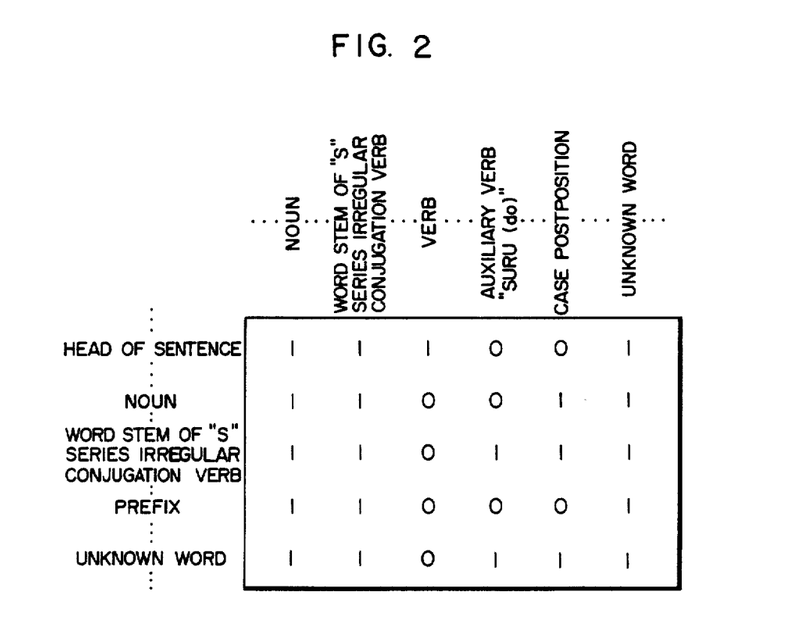
FIG. 2 is a diagram showing part of a connection matrix used in the present invention.

FIG. 2 shows part of a connection matrix. When a word dictionary is searched and a candidate word is found, it is checked on the basis of the connection matrix whether the part of speech of the candidate word can be grammatically connected to the part of speech of the preceding word or not. As shown in FIG. 2, in the connection matrix, each row and each column correspond to a category of a preceding word and that of a succeeding word respectively, and each matrix element is expressed by a binary digit. That is, when a matrix element has a value "1", the connection between the preceding word and the succeeding word is allowed, when a matrix element has a value "0", the connection is not allowed. For example, in a Japanese text that JIDOSHA (a noun indicating "automobile") Ga (a case postposition) HASHITTA (a verb indicating "ran"), the noun is connected to the case postposition. Accordingly, the intersection of the row indicative of the noun corresponding to the preceding word and the column indicative of the case postposition corresponding to the succeeding word has a value "1". Further, since the noun is not connected directly to the verb, the intersection of the row indicative of the noun corresponding to the preceding word and the column indicative of the verb corresponding to the succeeding word has a value "0". That is, the matrix element in the i-th row, the j-th column takes a value "1" or "0" depending upon whether the preceding word belonging to the category in the i-th row can be connected to the succeeding word belonging to the category in the j-th column or not.

Figure 3:
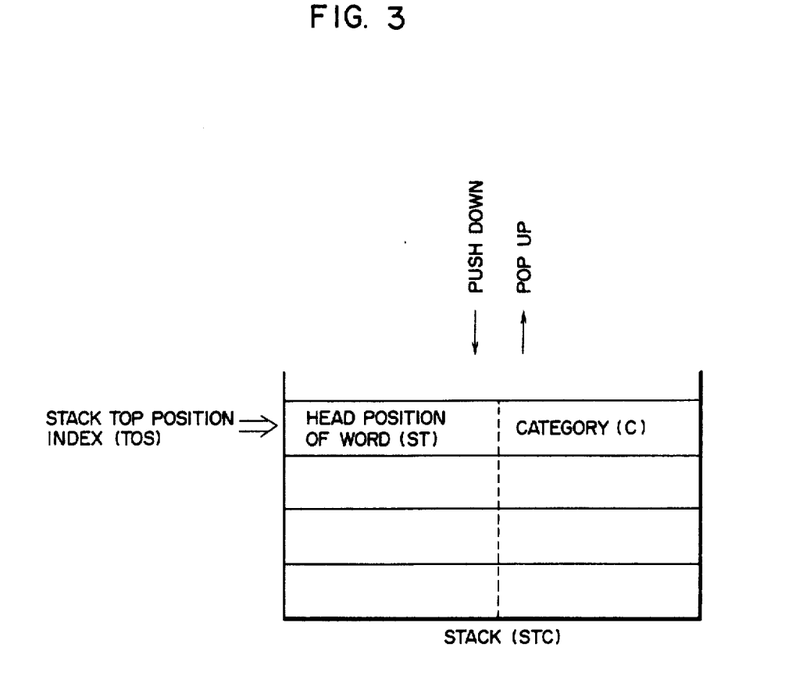
FIG. 3 is a schematic diagram for explaining a stack for segmentation which is used in the present invention.

FIG. 3 is a schematic diagram for explaining a segmentation stack (namely, a segmentation stack area) used in the present invention.

A segmentation stack is used for storing data corresponding to each of the words which are obtained by segmenting a text. As shown in FIG. 3, at least the head position ST of a word in a text and a category C to which the word belongs, are stored in a segmentation stack STC. This data is loaded in and taken out from the stack STC only at the top portion thereof. The stack STC performs a first-in last-out (FILO) operation, which means that data first loaded in the stack STC is lastly taken out therefrom. Accordingly, a stack top position index TOS for indicating the position of first data in the stack is stored in the stack STC.

The auxiliary segmentation stack STC area which is used for saving the result of segmentation thereto is also included in the storage device 2 and, has the same structure as the segmentation stack STC.

The dictionary file storage 4 stores records each of which uses a character string indicative of a word as an index. Each record contains at least a code indicating the category of the word.

In the present data processing system; when a search key is given, the dictionary search processor 3 searches the dictionary file storage 4 for the record with the longest index that is identical with the forepart of the search key. Such a search function can be realized using the well-known file organization method.

Figure 4A:
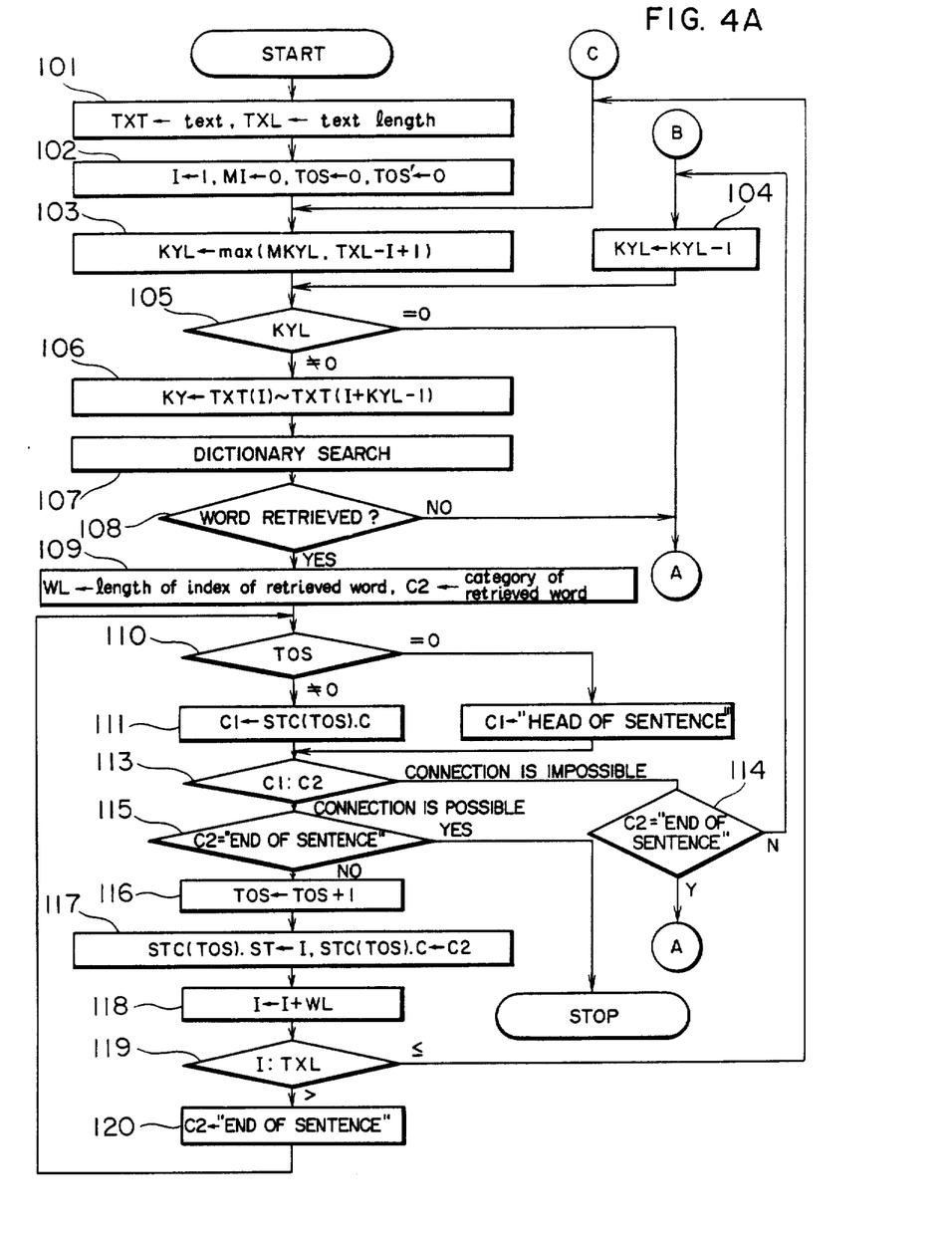
FIGS. 4A and 4B are a flow chart showing an embodiment of a method of segmenting a text into words according to the present invention.
Figure 4B:
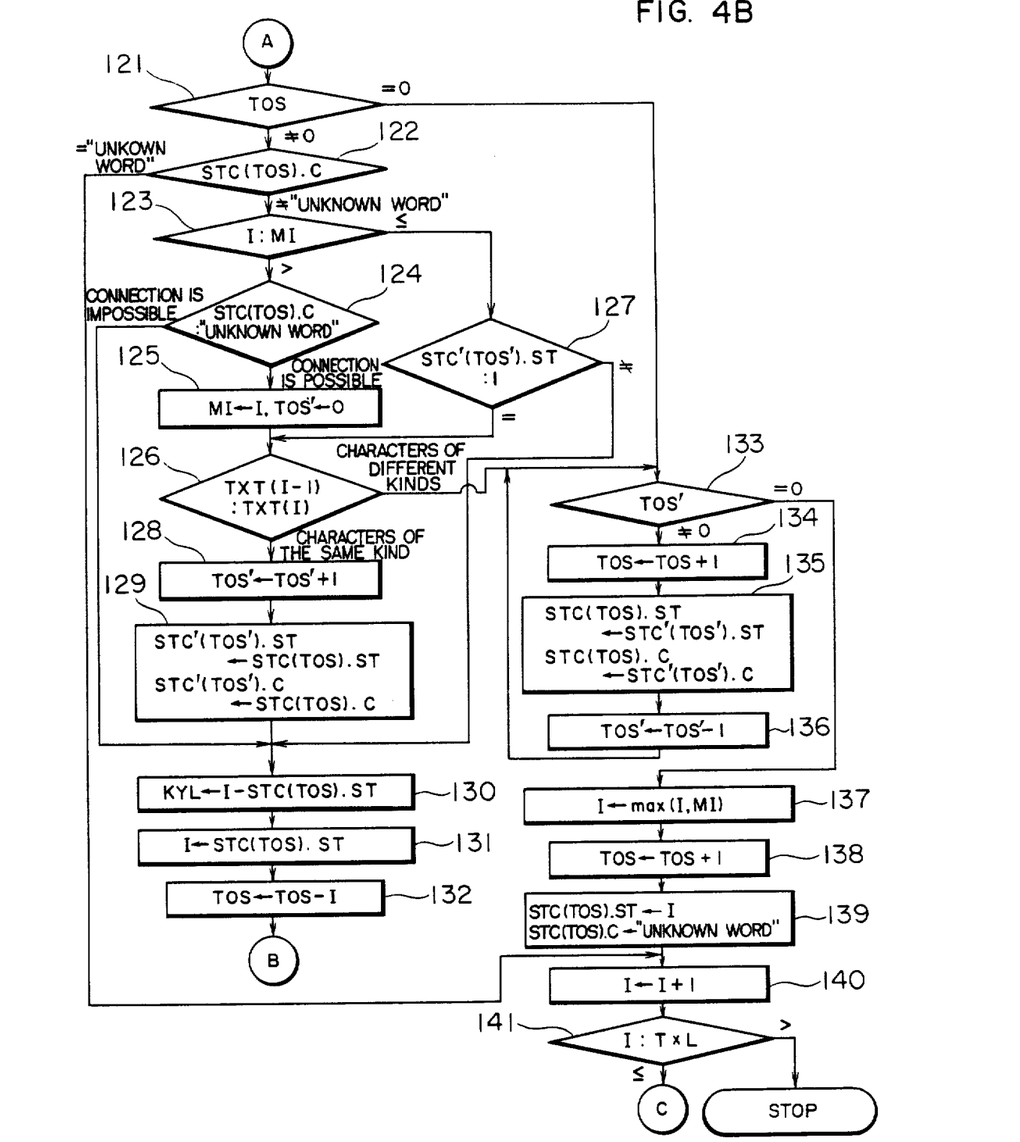

FIGS. 4A and 4B are a flow chart showing an embodiment of a method of segmenting a text into words according to the present invention.

The embodiment of FIGS. 4A and 4B has two features which will be explained below. Firstly, when the segmentation reaches a deadlock and hence the backtracking processing is carried out, the result of segmentation which is likely to be interrupted by the presence of an unknown word is preserved, so that the unknown word can be identified immediately after other segmenting operations have proved impossible. An example of the result of segmentation which is likely to be interrupted by the presence of an unknown word, is the result which terminates a word capable of having an unknown word as the succeeding word and is advanced farthest in the text. Secondly, the segmentation which will probably fail to obtain a correct segmentation is previously prevented from being tried by restricting the backtracking processing so that the backtracking processing is prevented from being carried out beyond that point of the text which satisfies a desired condition. An example of the point satisfying the desired condition is a point where the boundary between different kinds of characters (for example, the boundary between a cursive kana character and a Chinese character) coincides with the boundary between words. This is because the probability that the word boundary coincident with the boundary between different kinds of characters produces a correct segmentation, is very high.

In FIGS. 4A and 4B, reference numerals 101 and 102 designate steps for initiatization, 103 to 109 steps for dictionary search, 110 to 114 steps of checking whether connection is allowed or not, 115 to 120 steps for registering a word in the segmentation stack, 121 to 129 steps for saving a word to the auxiliary segmentation stack, 130 to 132 steps for deleting a word from the segmentation stack, 133 to 137 steps for transferring a word from the auxiliary segmentation stack to the segmentation stack, and 138 to 141 steps for registering an unknown word in the segmentation stack.

(i) Initialization:

A text inputted from the input device 5 is stored in the text area TXT, and the text length (namely, the number of characters in the text) TXL is determined (step 101). Next, an initial value "1", an initial value "0", an initial value "0", and an initial value "0" are set to an index I indicating the position of character in the text, an index MI indicating the position of a proposed unknown word in the text, an index TOS indicating top of segmentation stack, an index TOS' indicating top of the auxiliary segmentation stack, respectively (step 102).

(ii) Dictionary search:

In a case where the dictionary search using a character string which starts from the I-th character in the text, as a key, is carried out for the first time, the length KYL of search key is made equal to the greater one of a predetermined maximum value MKYL and the number of characters including the I-th character and following characters (step 103). The maximum value MKYL is made equal to the number of characters included in the longest one of the indexes which have been registered in the dictionary. It a case where the dictionary search using the character string which starts from the I-th character in the text, as the key, has been already carried out, that is, in a case where it has been known that the segmentation containing a word which has been retrieved in the previous dictionary search is impossible, a character string obtained by deleting the last single character from the word which has been retrieved in the previous dictionary search, is used as the search key (step 104). When it is judged in step 105 that the length of the search key is not equal to 1 (one), the search key is set in the search key area KY (step 106). When it is judged in step 105 that the length of the search key is equal to zero, the dictionary search is impossible, and hence the backtracking processing is carried out (steps which follow a reference mark Ⓐ ).

When the search key is set in the search key area KY, the dictionary search processor 3 is required to search for the record with the longest index that is identical with the forepart of the search key (step 107). When a desired record is present in the dictionary file, the dictionary search processing 3 stores the index, category code and others in the dictionary record area. When the record is retrieved in step 108, the length of the word given by the index and the category of the word are set in a memory area WL and a memory area C2, respectively (step 109). Then, it is checked whether the connection between words is allowed or not. When the record cannot be retrieved in step 108, the backtracking processing is carried out (steps which follow the mark Ⓐ).

(iii) Check for knowing whether connection between words is allowed or not:

The category of the succeeding one of two words which are to be checked as to whether the connection between the words is allowed or not, has been already set in the area C2. Accordingly, the category of the preceding word is set in a memory area C1 by reference to data stored in the top portion of the segmentation stack STC (step 111). However, when it is judged in step 110 that the segmentation stack STC is empty, "head of sentence" is set in the memory area C1, to carry out the processing for a word at the head of a sentence (step 112).

Next, it is checked by reference to the connection matrix whether the category set in the area C1 can be connected to the category set in the area C2 or not (step 113). When the connection is possible, the registration of a word in the segmentation stack is carried out. When the connection is judged to be impossible, it is checked in step 114 whether the area C2 indicates the end of the sentence or not. In a case of the end of the sentence, the backtracking processing is carried out (steps which follow the mark Ⓐ). In other cases, the dictionary search is again performed (step 104). (iv) Registration of word in segmentation stack:

When it is judged in step 113 that the connection is possible, it is checked in step 115 whether C2 indicates the end of the sentence or not (115). In a case of the end of the sentence, the segmentation processing terminates. In the other case, the word is registered in the segmentation stack STC. That is, a number 1 (one) is added to the stack top position index TOS (step 116). Next, the head position I of the word which is to be registered, in the text and the category of the above word read out of the area C2 are written in the top portion of the segmentation stack STC (step 117). Then, the index I indicating the position of a character in the text is advanced (step 118), to search for the next word. However, when it is judged in step 119 that the position indicated by the index I has reached the end of the sentence, "end of sentence" is set in the area C2, and then connection check at the end of sentence is carried out (steps 110–113).

(v) Saving word to auxiliary segmentation stack:

As shown in FIG. 4B, in the first half of the backtracking processing, a word data is saved from the segmentation stack STC to the auxiliary segmentation stack STC'. This saving of word data is carried out in order that the result of the segmentation processing which has failed halfway is preserved, and utilized when other solutions cannot be found.

First, it is checked whether the segmentation stack STC is empty or not (step 121). When the stack STC is judged to be empty, data to be saved is absent. Accordingly, data in the auxiliary segmentation stack STC' is returned to the segmentation stack STC (steps 134 to 136), and then the processing for determining an unknown word is carried out (steps 137 to 139). Further when it is judged in step 122 that the contents of the top portion of the stack STC corresponds to an "unknown word", the processing for elongating the unknown word by one character is carried out (step 140).

Next, when it is judged in step 123 that the present position I in the text is farther advanced as compared with the position MI of a proposed unknown word and also it is judged in step 124 that the word indicated by the top portion of the stack can be succeeded by an "unknown word", the proposed unknown word is updated. That is, the present position I is used as the position of a new proposed unknown word, and that data in the auxiliary segmentation stack STC' which has become useless, is deleted (step 125). Next, it is checked in step 126 whether the character at the position I and the preceding character are of the same kind or not. When the above characters are judged to be of the same kind, data is saved to the auxiliary segmentation stack STC' (steps 128 and 129). Further, when the above characters are different in kind from each other, further backtracking processing is not carried out, and data in the auxiliary segmentation stack STC' is returned to the segmentation stack STC, to carry out the processing for determining an unknown word. When it is judged in step 123 that the present position I is farther advanced as compared with the position MI and it is judged in step 124 that the word indicated by the top portion of the stack STC cannot be succeeded by an "unknown word", the saving of data is not carried out, but the deletion of the word from the segmentation stack STC is immediately carried out (steps 130 to 132).

Further, when it is judged in step 123 that the present position I is not farther advanced as compared with the position MI and it is judged in step 127 that the position of the word indicated by the top portion of the auxiliary segmentation stack STC' coincides with the position I, it is checked in step 126 whether the character at the position I and the preceding word are of the same kind or not. When the above characters are judged to be of the same kind, data is saved to the auxiliary segmentation stack STC (steps 128 and 129). When the above characters are different in kind from each other a further backtracking processing is not carried out, but data in the auxiliary segmentation stack STC' is returned to the segmentation stack STC, to carry out the processing for determining an unknown word (steps 133 to 139). When it is judged in step 127 that the position of the word indicated by the top position of the stack STC' does not coincide with the position I, the deletion of the word from the segmentation stack STC is immediately carried out (steps 130 to 132).

(vi) Deletion of word from segmentation stack:

In the second half of the backtracking processing, a word data is deleted from the segmentation stack STC. That is, the length of a word to be deleted is set to the search key length KYL (step 130), and the current position I in the text is changed to the head position of the above word (step 131). Then, a data with respect to the word is deleted from the stack STC (step 132), and dictionary search is again performed (steps which follow a reference mark B ).

(vii) Transfer of the data of auxiliary segmentation stack to segmentation stack:

In a case where further backtracking processing cannot be performed, the data of the auxiliary segmentation stack STC' is returned to the segmentation stack STC.

For this purpose, the processing in steps 134 to 136 for transferring data at the top portion of the auxiliary segmentation stack STC' to the top portion of the segmentation stack STC is repeated until it is judged in step 133 that no data is present in the auxiliary segmentation stack STC'. Further, the current position I is updated in accordance with the updated contents of the segmentation stack STC (step 137).

(viii) Registration of unknown word in segmentation stack:

When the contents of the auxiliary segmentation stack STC' are returned to the segmentation stack STC, one character at the present position on the text is registered as an "unknown word" at the top portion of the segmentation stack STC (steps 138 and 139). Next, the index I is advanced by one character (step 140), and then a dictionary search is performed (steps which follows a reference mark Ⓒ). However, when it is judged in step 141 that the character indicated by the index I has reached the end of the text, the segmentation processing terminates.

In the above, explanation has been made on an embodiment of a method of segmenting a text into words using a processing unit 1. The result of segmentation left in the segmentation stack area is sent to the output device 6 by the processing unit 1.

As can be seen from the above, according to the present embodiment, an unknown word in the text can be efficiently identified. Even when a text contains an unknown word, a segmentation processing is performed for the whole of the text, and therefore the next processing, such as the syntactic analysis can immediately follow the segmentation processing. Thus, in the machine translation, a translation can be delivered which contains an unknown word written in the source language.

While, when a text contains no unknown word, the result of segmentation is the same as in the conventional method. The present embodiment includes the processing for preserving the result of segmentation which is likely to be interrupted by the presence of an unknown word, and therefore is inferior in processing efficiency to the conventional method. However, since only the result of segmentation which is likely to be interrupted by the presence of an unknown word is preserved, the reduction in processing efficiency is very minor. Further, according to the present embodiment, the range of the backtracking processing is limited, and therefore there is a possibility of a correct solution being missed. However, since a statistically significant point, such as the boundary between different kinds of characters is used as a limiting point, the probability that a correct segmentation is missed is small, and the effect of the present embodiment that an unknown word can be efficiently identified, outweights the above drawback.

Figure 5A:
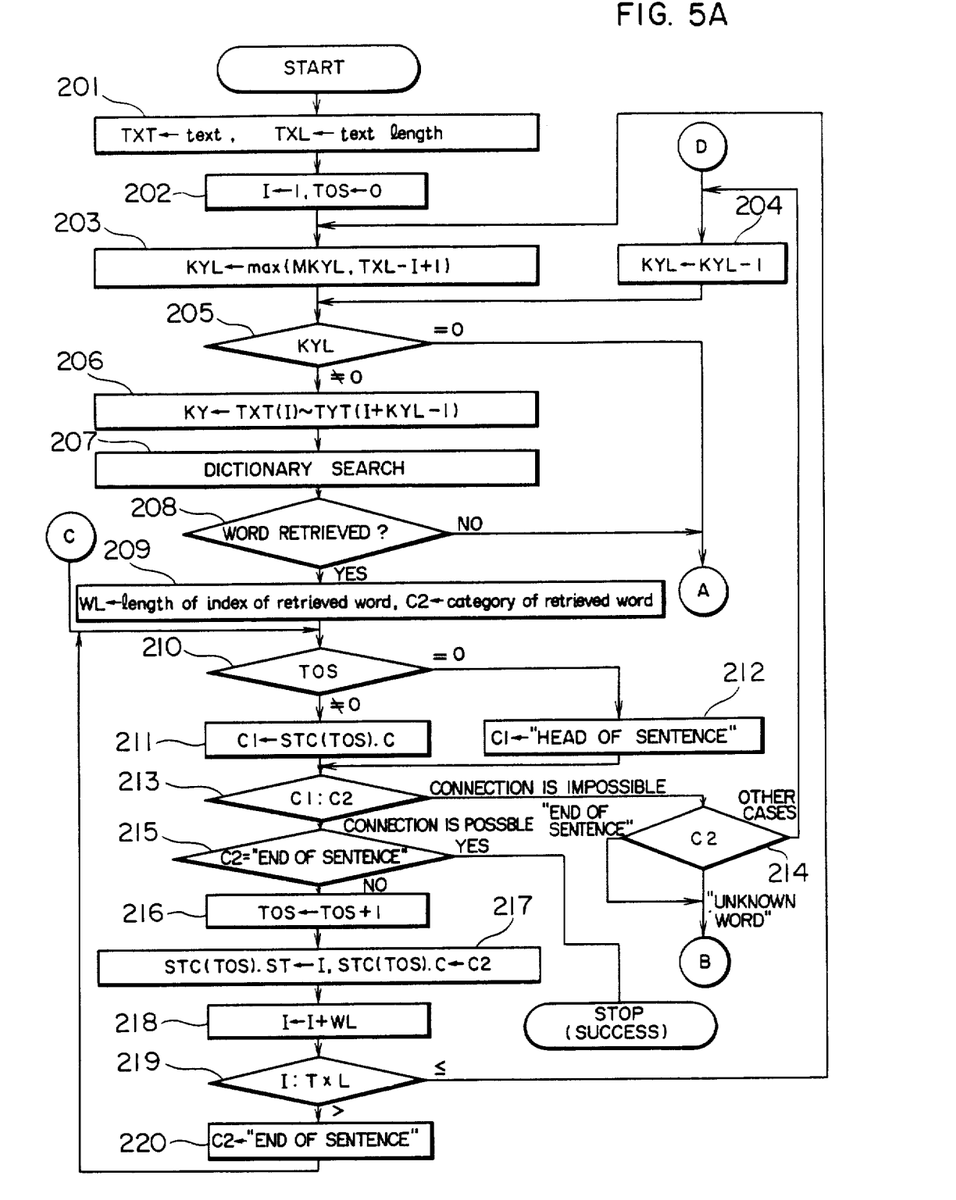
FIGS. 5A and 5B are a flow chart showing another embodiment of a method of segmenting a text into words according to the present invention.
Figure 5B:
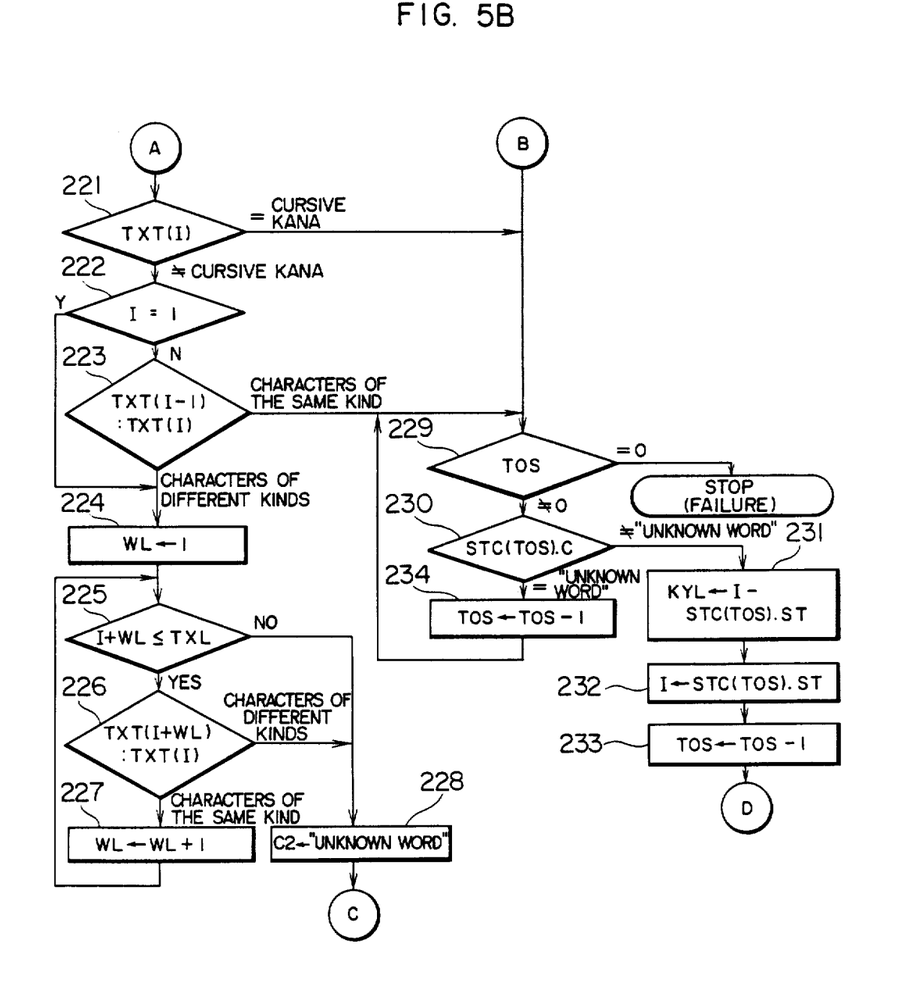

FIGS. 5A and 5B are a flow chart showing another embodiment of a method of segmenting a text into words according to the present invention.

In FIGS. 5A and 5B, reference numerals 201 and 202 designate steps for initialization, 203 to 209 steps for dictionary search, 210 to 214 steps for checking whether connection is grammatically possible or not, 215 to 220 steps for registering a word in the segmentation stack, 221 to 228 steps for identifying an unknown word, and 229 to 234 steps for deleting a word from the segmentation stack.

The embodiment of FIGS. 5A and 5B is based upon two facts. Firstly, in a Japanese text, the boundary between words statistically has a close relation with the boundary between different kinds of characters, (namely, the boundary between two Chinese characters, cursive kana characters, kana characters having a square form, namely, Japanese katakana characters, alphabetic characters and others), and the probability that the boundary between a cursive kana character and other kinds of characters is the boundary between words, in high. Secondly, in many application systems, a proper noun or a technical term given to a new concept in technical field often becomes an unknown word. When viewed from the standpoint of the kind of character, most unknown words are composed of characters of the same kind other than the cursive kana character, that is, are formed of a Chinese character string, a katakana character string, an alphabetic character string or others. Further, when viewed from the standpoint of the part of speech, an unknown word is limited to the noun, the word stem of "s" series irregular conjunction verb, and others.

In view of the above facts, in the present embodiment, only a Chinese character string, a katakana character string and an alphabetic character string each sandwiched between characters different in kind from the string, are treated as a proposed unknown word. Further, an unknown word is treated as one of categories used for checking whether the connection between words is possible or not. Accordingly, the categories of words which can grammatically precede/succeed an unknown word, are previously determined as done for other categories. When the segmentation processing based upon the dictionary search and the connection check comes to a deadlock on the above premises, it is checked whether the deadlock is caused by the presence of an unknown word or not. When the deadlock is judged to be caused by the unknown word, the backtracking processing is not performed, but the segmentation processing is continued.

Incidentally, the resources for FIGS. 1 to 3 are also used in carrying out the embodiment of FIGS. 5A and 5B.

(i) Initialization:

A text inputted from the input device 5 is stored in the text area TXT of the storage device 2, and the text length TXL is determined (step 201). Next, an initial value "1" and an initial value "0" are set to the index I indicating the position of a character in the text and the index TOS indicating the top of the segmentation stack, respectively (step 202).

(ii) Dictionary search:

In a case where the dictionary search using a character string which starts from the I-th character in the text, as a key, is carried out for the first time, the length KYL of search key is made equal to the greater one of a predetermined maximum value MKYL and the number of characters including the I-th character and following characters (step 203). The maximum value MKYL is made equal to the number of characters included in the longest one of indexes which have been registered in the dictionary. In a case where the dictionary search using the character string which starts from the I-th character in the text, as the key, has been already carried out, a character string obtained by deleting the last one character from the word which has been used in the previous dictionary search, is used as the search key (step 204). When it is judged in step 205 that the length of the search key is not equal to 1 (one), the search key is set in the search key area KY (step 206). When it is judged in step 205 that the length of the search key is equal to zero, the dictionary search is impossible, and hence the processing for examining the possibility of the presence of an unknown word is carried out (steps which follow a reference mark Ⓐ in FIG. 5B). When the search key is set in the search key area KY, the dictionary search processor 3 is required to search for the record with the longest index that is identical with the forepart of the search key (step 207). When a desired record is present in the dictionary file, the dictionary file processor 3 stores the index, category code and others in the dictionary record area. When the record is retrieved in step 208, the length of the word given by the index and the category of the word are set in the memory area WL and the memory area C2, respectively (step 209). Then, the connection check is carried out. When the record cannot be retrieved in step 208, the processing for examining the possibility of the presence of an unknown word is carried out (steps which follow the reference mark Ⓐ in FIG. 5B).

(iii) Check for knowing whether connection between words is allowed or not:

The category of the succeeding one of two words which are to be checked as to whether the connection between these words is allowed or not, has been already set in the area C2. Accordingly, the category of the preceding word is set in the area C1 by reference to data in the top portion of the segmentation stack (step 211). However, when it is judged in step 210 that the segmentation stack is empty, the "head of sentence" is set in the area C1, to carry out the processing for a word at the head of a sentence, (step 212). Next, it is checked by reference to the connection matrix whether the category set in the area C1 can be connected to the category set in the area C2 or not (step 213). When the connection is possible, the registration of the word in the segmentation stack is carried out. When the connection is impossible, the processing in step 214 is carried out. When it is judged in step 214 that the category set in the area C2 is the "unknown word" or "end of sentence" the deletion of the word from the segmentation stack is carried out (steps which follow a reference mark Ⓑ in FIG. 5B). In other case, the dictionary search is again performed (step 204).

(iv) Registration of word in segmentation stack:

When it is judged in step 213 that the connection is possible, it is checked in step 215 whether C2 indicates the end of the sentence or not. When indicating the end of the sentence, the segmentation processing terminates. In other case, the word is registered in the segmentation stack. That is, a number 1 (one) is added to the stack top position index TOS (step 216). Next, the position I of the word which is to be registered, in the text and the category of this word read out of the area C2 are written in the top portion of the segmentation stack (step 217). Then, the index I indicating the position of character in the text is advanced (step 218), to search for the next word (steps 219 and 203). However, when it is judged in step 219 that the character indicated by the index I has reached the end of the sentence, the "end of sentence" is set in the area C2 (step 220), and then connection check at the end of sentence is carried out steps 210–213).

(v) Identification of unknown word:

A character string composed of characters of the same kind other than the cursive kana character, is considered to be a proposed unknown word. Accordingly, it is first checked in step 221 whether the I-th character in the text is a cursive kana character or not. When the I-th character is not a cursive kana character, it is checked in step 222 whether the I-th character is placed at the head of the sentence or not. When the I-th character is not placed at the head of the sentence, it is checked in step 223 whether the I-th character is different in kind from the (I-1)th character or not. When the I-th character is different in kind from the (I-1)the character, the I-th character is considered to be the head character of an unknown word. When it is judged in step 221 and 223 that the I-th character cannot be the head character of the an unknown word, the deletion of word from the segmentation stack is carried out (step 229 and following steps). While, when the I-th character is judged to be the head character of an unknown word, the text is scanned in the forward direction until a different kind of character appears, to determine the length of the unknown word, and the length of the unknown word thus obtained is set in the area WL (steps 224 to 227). Further, the "unknown word" is set in the area C2 (step 228). Then, the connection check is carried out (steps which follow a reference mark Ⓒ in FIG. 5A).

(vi) Deletion of word from segmentation stack:

When it is required to delete a word from the segmentation stack, it is checked in step 229 whether the segmentation stack is empty or not. When the stack is empty, the segmentation is considered to result in a failure, and the segmentation processing terminates. When the stack is not empty, data is deleted from the top portion of the segmentation stack (steps 230 to 234). That is, when it is judged in step 230 that the category stored in the top portion of the segmentation stack is not the "unknown word", the length of the word corresponding to the above category is set to the search key length KYL (step 231). Then, the index I indicating the position of character in the text is returned to the head position of the above word (step 232). Next, the stack top position index TOS is reduced by one, to delete data in the top portion of the segmentation stack (step 233). Then, the dictionary search is carried out using that character string in the text which starts from the I-th character (steps which follow a reference mark Ⓓ in FIG. 5A). Further, when it is judged in step 230 that the category stored in the top portion of the segmentation stack is the "unknown word", data in the top portion of the segmentation stack is deleted (step 234), and then the processing for deleting the next data is carried out (step 229).

Each processing for segmentation is successively and repeatedly carried out in the above-mentioned manner. The result of segmentation left in the segmentation stack area is set to the output device 6 by the processiing unit 1.

According to the embodiment of FIGS. 5A and 5B, the probability that the whole of a text containing an unknown word is segmented into words is very high. Further, the processing based upon the assumption that a certain portion of the text is an unknown word, is carried out only in a case where the probability that the portion is an unknown word is high, and moreover is carried out before the back-tracking processing. Thus, a time required for segmentation processing is short. The processing based upon the above assumption is carried out, only in a case where after the segmentation processing based upon only words registered in the dictionary, has come to a deadlock. Accordingly, the processing efficiency is not lowered, for a text containing no unknown word. As mentioned above, the embodiment of FIGS. 5A and 5B can efficiently perform the automatic segmentation of a text containing an unknown word into words. When the fact that the registration of all words in the dictionary is impossible is taken into account, the present embodiment is very effective from the practical point of view.

As has been explained in the foregoing, according to the present invention, an unknown word contained in a text can be efficiently identified, and the automatic segmentation of a text which may contain an unknown word, into words can be efficiently made. Accordingly, the present invention can practically exhibit a remarkable effect in a natural language processing system.

We claim:

1. A method of segmenting a text into words for which a dictionary search is carried out using a character string in the text as a search key, and in which it is determined whether a word retrieved from a word dictionary can be grammatically connected to a preceding word, said method comprising the steps of:
   segmenting a character string of the text into words using only words registered in the word dictionary;
   identifying a word in the text undergoing segmentation processing as a possible unknown word, when said segmentation processing reaches a deadlock;
   verifying that the possible unknown word is the unknown word based on character kind information in the text; and
   continuing said segmentation processing for a portion of said text which follows the identified unknown word.

2. A method of segmenting a text into words according to claim 1, wherein said step of verifying an unknown word includes a step of preserving the result of segmentation which is obtained during a backtracking processing and is likely to be interrupted by the presence of an unknown word, and a step of considering a succeeding word of said result of segmentation which is obtained during the backtracking processing, as an unknown word immediately after it has been determined that other segmenting operations are now allowed.

3. A method of segmenting a text into words according to claim 1, wherein said step of verifying an unknown word includes a step of carrying out a backtracking processing within a predetermined range so that said backtracking processing is inhibited from being carried out beyond a position where the boundary between different kinds of characters coincides with the boundary between words.

4. A method of segmenting a text into words according to claim 2, wherein said step of verifying an unknown word includes a step of carrying out a backtracking processing within a predetermined range so that said backtracking processing is inhibited from being carried out beyond a position where the boundary between different kinds of characters coincides with the boundary between words.

5. A method of segmenting a text into words according to claim 1, wherein said step of verifying an unknown word includes a step of using one of a Chinese character string, a Japanese kana character string and an alphabetic character string each sandwiched between characters different in kind from said character string, as a possible unknown word, when said segmentation processing which uses only words registered in the word dictionary reaches a deadlock.

6. A method of segmenting text into words according to claim 1, wherein said text includes sentences lacking discrete boundaries between the words thereof.

7. A method of segmenting a text into words comprising:
   a first step of carrying out a dictionary search using a character string in said text as a search key;
   a second step of checking whether a word of said text retrieved from a dictionary can be grammatically connected to a preceding word of said text;
   a third step of preserving a result obtained during the segmenting processing when a backtracking processing is carried out for a deadlock encountered in the processing in at least one of said first and second steps;
   a fourth step of determining the presence of an unknown word in the text, based on character kind information of the text; and
   a fifth step of resuming the segmenting processing utilizing the preserved result when the presence of the unknown word is determined.

8. A method of segmenting a text into words according to claim 7, wherein said text includes sentences lacking discrete boundaries between the words thereof.

* * * * *